US006657602B2

(12) United States Patent
Endo et al.

(10) Patent No.: US 6,657,602 B2
(45) Date of Patent: Dec. 2, 2003

(54) IMAGE DISPLAY APPARATUS

(75) Inventors: Takeshi Endo, Osaka (JP); Yasushi Kobayashi, Itami (JP); Ichiro Kasai, Kawachinagano (JP); Hideki Nagata, Kobe (JP)

(73) Assignee: Minolta Co., Ltd., Osaka (JP)

( * ) Notice: Subject to any disclaimer, the term of this patent is extended or adjusted under 35 U.S.C. 154(b) by 238 days.

(21) Appl. No.: 09/745,462

(22) Filed: Dec. 26, 2000

(65) Prior Publication Data
US 2001/0005185 A1 Jun. 28, 2001

(30) Foreign Application Priority Data
Dec. 27, 1999 (JP) .......................... H11-369281

(51) Int. Cl.[7] .................................. G09G 5/00
(52) U.S. Cl. ................................ 345/8; 7/647
(58) Field of Search .................... 345/7–8, 647; 359/630; 348/53

(56) References Cited

U.S. PATENT DOCUMENTS

| | | | | |
|---|---|---|---|---|
| 4,656,521 A | * | 4/1987 | Trzeciak et al. | 348/744 |
| 5,369,450 A | * | 11/1994 | Haseltine et al. | 348/745 |
| 5,392,158 A | | 2/1995 | Tosaki | |
| 5,414,521 A | * | 5/1995 | Ansley | 348/123 |
| 5,479,224 A | * | 12/1995 | Yasugaki et al. | 353/101 |
| 5,748,264 A | * | 5/1998 | Hegg | 348/746 |
| 5,889,625 A | * | 3/1999 | Chen et al. | 359/637 |
| 6,008,939 A | * | 12/1999 | Hebert | 359/475 |
| 6,140,979 A | * | 10/2000 | Gerhard et al. | 345/7 |
| 6,462,769 B1 | * | 10/2002 | Trowbridge et al. | 348/51 |

FOREIGN PATENT DOCUMENTS

| | | |
|---|---|---|
| JP | H5-260527 | 10/1993 |
| JP | H6-102469 | 4/1994 |
| JP | H7-110455 | 4/1995 |

* cited by examiner

Primary Examiner—Richard Hjerpe
Assistant Examiner—Duc Quang Dinh
(74) Attorney, Agent, or Firm—Burns, Doane, Swecker & Mathis, LLP

(57) ABSTRACT

An image display apparatus has a signal input portion for receiving an image signal, an image compensator for electrically compensating the image signal for distortion so that a left and a right image displayed in an observer's left and right eyes have identical distortion and then outputting a left and right image signal that correspond to the left and right images, a signal switcher for switching between the left and right image signals output from the image compensator so as to output the left and right images alternately chronologically, a single two-dimensional image display device for displaying a two-dimensional image in accordance with the image signal output from the signal switcher, a pair of left and right eyepiece optical systems for directing image light exiting from the two-dimensional image display device to the observer's left and right eyes so that the two-dimensional image is displayed as a virtual image in the observer's eyes, and an optical path switcher for time-divisionally switching optical paths from the two-dimensional image display device to the observer's eyes in synchronism with switching between the left and right image signal output from the signal switcher so that the image light enters either the observer's left or right eye at a time.

20 Claims, 8 Drawing Sheets

IMAGE DISPLAY APPARATUS

This application is based on application No. H11-369281 filed in Japan on Dec. 27, 1999, the entire contents of which are hereby incorporated by reference.

BACKGROUND OF THE INVENTION

1. Field of the Invention

The present invention relates to an image display apparatus, and particularly to an image display apparatus, such as a head-mounted display (hereinafter, referred to as an HMD), that is suitably mounted on the head of an observer while in use.

2. Description of the Prior Art

FIG. 12 shows the optical construction of a conventional, typical HMD. This HMD is provided with a pair of left and right image display devices (1L, 1R), and a pair of left and right eyepiece optical systems (2L, 2R), so as to correspond to an observer's left and right eyes (EL, ER). In this optical construction, the two-dimensional image displayed on the image display device (1L) for the left eye (EL) is displayed in the left eye (EL) as a virtual image through the eyepiece optical system (2L) for the left eye (EL), and the two-dimensional image displayed on the image display device (1R) for the right eye (ER) is displayed in the right eye (ER) as a virtual image through the eyepiece optical system (2R) for the right eye (ER).

In the HMD shown in FIG. 12, two image display devices (1L, 1R) are used. It is possible to use only one image display device and share the single image displayed thereon between the left and right eyes of an observer. This makes it possible to reduce the costs of the apparatus by the cost of one image display device. However, sharing the image displayed on a single image display device between the left and right eyes requires an optical construction that separates the image between the left and right eyes, which leads to degradation in the quality of the displayed image.

SUMMARY OF THE INVENTION

An object of the present invention is to provide an image display apparatus that can be manufactured at lower cost without sacrificing the quality of the displayed image.

To achieve the above object, according to the present invention, an image display apparatus is provided with: a signal input portion for receiving an image signal; an image compensator for electrically compensating the image signal for distortion so that a left and a right image displayed in an observer's left and right eyes have identical distortion and then outputting a left and right image signal that correspond to the left and right images; a signal switcher for switching between the left and right image signals output from the image compensator so as to output the left and right images alternately chronologically; a single two-dimensional image display device for displaying a two-dimensional image in accordance with the image signal output from the signal switcher; a pair of left and right eyepiece optical systems for directing image light exiting from the two-dimensional image display device to the observer's left and right eyes so that the two-dimensional image is displayed as a virtual image in the observer's eyes; and an optical path switcher for time-divisionally switching optical paths from the two-dimensional image display device to the observer's eyes in synchronism with switching between the left and right image signals output from the signal switcher so that the image light enters either the observer's left or right eye at a time.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, image display apparatuses embodying the present invention will be described with reference to the drawings. It is to be noted that, in the following descriptions, such elements as serve the same or corresponding functions between different embodiments are identified with the same reference symbols, and overlapping explanation will be omitted unless desirable.

COMPARATIVE EXAMPLE (FIG. 11)

Figure 11:
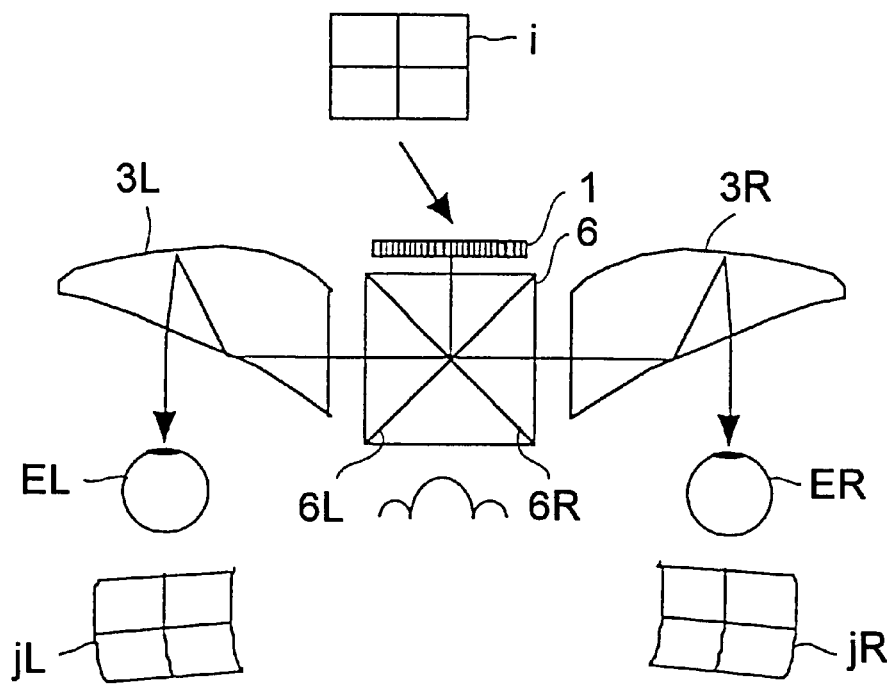
FIG. 11 is an optical construction diagram schematically showing a comparative example of an image display apparatus.

As described earlier, sharing a single image between the left and right eyes requires an optical construction that separates the image between the left and right eyes, which leads to degradation in the quality of the displayed image. How the quality of the displayed image is degraded will be explained with reference to a comparative example shown in FIG. 11. The image display apparatus shown in FIG. 11 is composed of a single liquid crystal display device (1), a cross prism (6) having two semi-transmissive surfaces (6L, 6R) arranged so as to cross each other, and a pair of left and right eyepiece optical systems (3L, 3R).

The liquid crystal display device (1) is a two-dimensional image display device for displaying a two-dimensional image (i) in accordance with an image signal fed in from outside, and its screen, on which the two-dimensional image (i) is displayed, is rectangular with 0% distortion. The image light exiting from the liquid crystal display device (1) is separated in horizontal leftward and rightward directions by the two semi-transmissive surfaces (6L, 6R) of the cross prism (6). The image light separated by the cross prism (6) enters the pair of left and right eyepiece optical systems (3L, 3R). Through the eyepiece optical systems (3L, 3R), the image light separated by the cross prism (6) is directed to the left and right eyes (EL, ER) of an observer, so that two dimensional images (jL, jR) are displayed in the observer's eyes (EL, ER) as virtual images.

The eyepiece optical systems (3L, 3R) are both built as a uniaxially decentered prism optical system that is not axisymmetric horizontally, and they are decentered in laterally opposite directions. Therefore, in the individual eyepiece optical systems (3L, 3R), distortion occurs in laterally opposite directions, causing the left and right images (jL, jR) displayed in the left and right eyes (EL, ER) to have different distortion. With different distortion in the left and right observed images (jL, jR), the observer's eyes (EL, ER) have difficulty in merging the two images. This difficulty in image merging makes the use of the apparatus eye-straining. To overcome this, in the embodiments of the invention described below, the quality of the displayed image is enhanced by making the left and right observed images have identical distortion.

Figure 12:
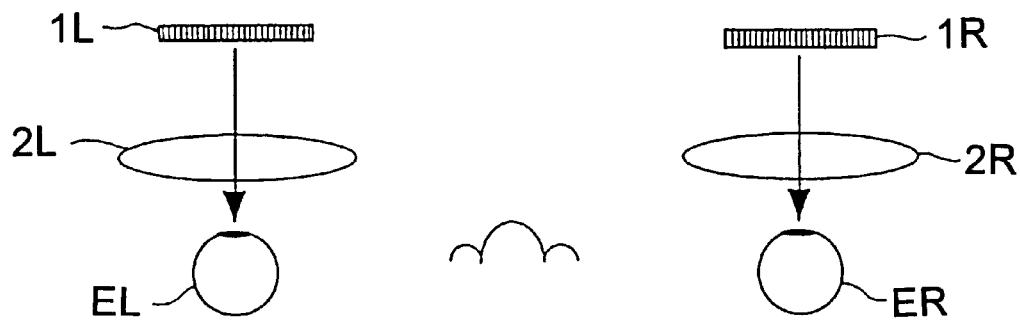
FIG. 12 is an optical construction diagram schematically showing a conventional example of an image display apparatus.

All the embodiments described below deal with a head-mounted image display apparatus (such as an HMD) that is suitably mounted on an observer's head (on an upper part of the head, on the face, or the like) and therefore that is so structured that the constituent components thereof are held together and mounted on the observer's head by an unillustrated holding means (a goggle-like frame, belt, or the like). Alternatively, its constituent components except those which must be disposed in front of the observer's eyes (EL, ER) (such as eyepiece optical systems) may be fitted on other parts of the observer than the head, or the whole apparatus may be held with the hands as with binoculars. In all the embodiments, the image displayed on a single liquid crystal display device (1) is shared between the left and right eyes (EL, ER), and this helps make image display apparatuses less costly than the conventional example (FIG. 12).

Figure 1:
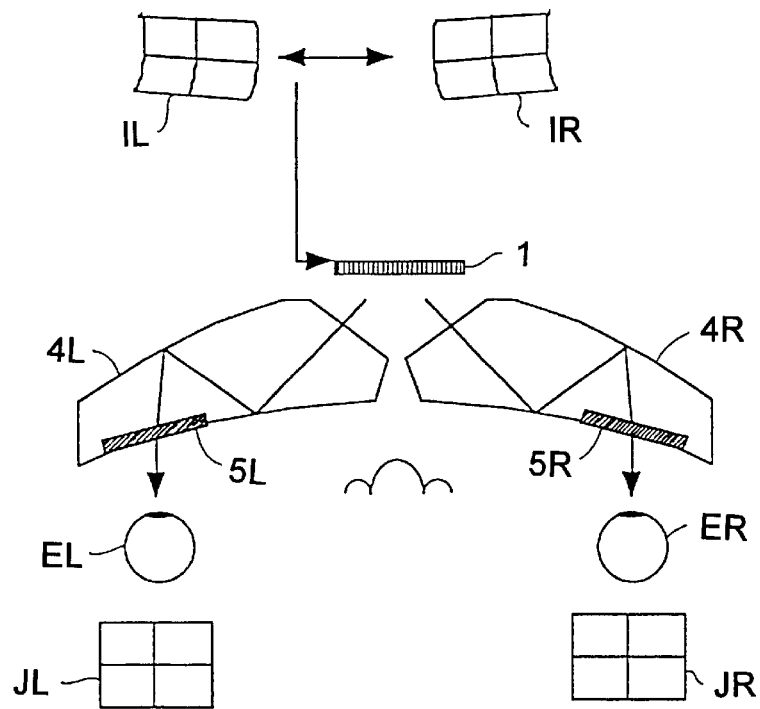
FIG. 1 is an optical construction diagram schematically illustrating the outline of the construction of a first embodiment of the invention.

First Embodiment (FIG. 1)

FIG. 1 shows the optical construction of a first embodiment of the invention. This image display apparatus has a single liquid crystal display device (1), a pair of left and right eyepiece optical systems (4L, 4R), and a pair of left and right liquid crystal shutters (5L, 5R). The liquid crystal display device (1) is a two-dimensional image display device for displaying two-dimensional images (IL, IR) in accordance with an image signal fed in from outside. In this embodiment, instead of the liquid crystal display device (1), a two-dimensional image display device of any other type may be used, for example a self illuminating element such as a plasma display device, an LED (light emitting diode) display device, and a CRT (cathode-ray tube). The image light exiting from the liquid crystal display device (1) enters the pair of left and right eyepiece optical systems (4L, 4R). The eyepiece optical systems (4L, 4R), by directing the image light to an observer's left and right eyes (EL, ER), display virtual images of the two-dimensional images (JL, JR) in the observer's eyes (EL, ER). Concurrently, the liquid crystal shutters (5L, 5R) switch optical paths in a manner described later.

The pair of left and right eyepiece optical systems (4L, 4R) are both built as a uniaxially decentered prism optical system that is not axisymmetric horizontally, and they are decentered in laterally opposite directions. Therefore, as in the comparative example (FIG. 11) described earlier, in the individual eyepiece optical systems (4L, 4R), distortion occurs in laterally opposite directions. However, the control configuration described below eventually makes the left and right images (JL, JR) displayed in the left and right eyes (EL, ER) have identical distortion (here, 0% distortion).

Figure 8:
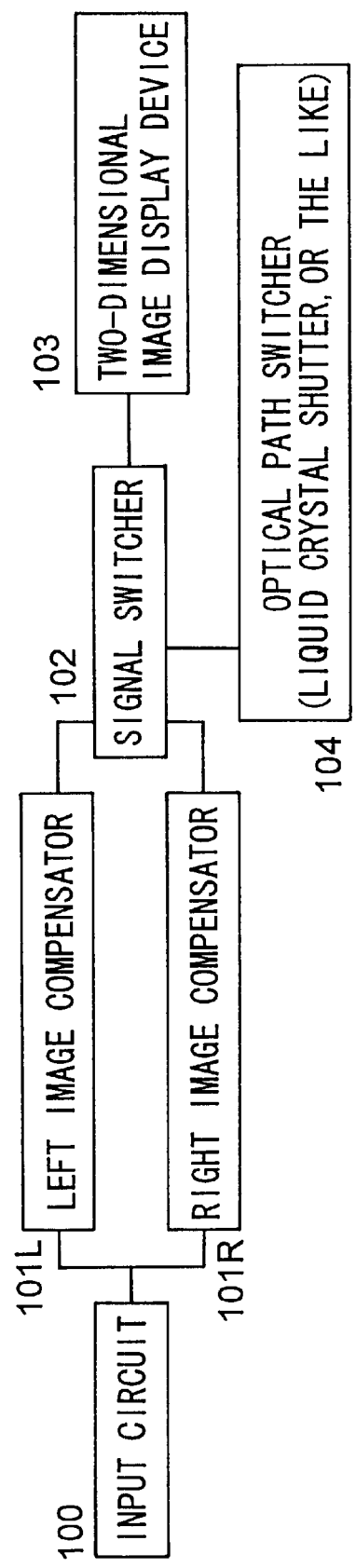
FIG. 8 is a block diagram illustrating a control configuration for displaying a two-dimensional image.

First, a control configuration used to display a two-dimensional image in the observer's eyes (EL, ER) will be explained with reference to FIG. 8. An input circuit (100) is a means for receiving a two-dimensional image signal. The image signal fed in through the input circuit (100) is fed to a left image compensator (101L) and a right image compensator (101R). The individual image compensators (101L, 101R) electrically compensate the image signal for distortion so that the left and right images (JL, JR) displayed in the observer's left and right eyes (EL, ER) have identical distortion (i.e. so that both the images have 0% distortion), and then output left and right image signals corresponding to the left and right images (IL, IR). Through this distortion compensation, two-dimensional images (IL, IR) are displayed that have opposite distortion to that occurring between the liquid crystal display device (1) serving as a two-dimensional image display device (103) and the observer's eyes (EL, ER) (i.e. the distortion caused by the eyepiece optical systems (4L, 4R)).

A signal switcher (102) switches between the left and right image signals output from the image compensators (101L, 101R) so as to output them alternately chronologically. The two-dimensional image display device (103) corresponding to the above-mentioned liquid crystal display device (1) displays two-dimensional images (IL, IR) in accordance with the image signals received from the signal switcher (102). That is, the two-dimensional image display device (103) displays two distortion-compensated two-dimensional images (IL, IR) time-divisionally and alternately.

An optical path switcher (104) corresponding to the above-mentioned liquid crystal shutters (5L, 5R), in synchronism with the switching between the left and right images output from the signal switcher (102), time-divisionally switches optical paths from the two-dimensional image display device (103) to the observer's eyes (EL, ER) so that the image light enters either the left or right eye of the observer (EL, ER). In this embodiment, two liquid crystal shutters (5L, 5R) are opened and closed in synchronism with the display of the two-dimensional images (IL, IR). Thus, a state in which only the left image (JL) is displayed only in the left eye (EL) and a state in which only the right image (JR) is displayed only in the right eye (ER) alternate. In this embodiment, the liquid crystal shutters (5L, 5R) are disposed at the exit surfaces of the eyepiece optical systems (4L, 4R); however, the liquid crystal shutters (5L, 5R) serving as the optical path switcher (104) may be disposed elsewhere as long as they are disposed somewhere in the optical paths from the liquid crystal display device (1) to the observer's left and right eyes (EL, ER).

The operation of the individual blocks will be explained in more detail below. When the left image (IL) is displayed on the liquid crystal display device (1), the liquid crystal shutter (5L) for the left eye (EL) is open (i.e. the image light is transmitted) and the liquid crystal shutter (5R) for the right eye (ER) is closed (i.e. the image light is intercepted). Thus, now, only the left image (JL) is observed only by the left eye (EL). Since the left image (IL) displayed on the liquid crystal display device (1) has opposite distortion to the distortion occurring between the liquid crystal display device (1) and the left eye (EL) (i.e. the distortion caused by the eyepiece optical system (4L)), when this image is observed through the eyepiece optical system (4L), the distortion of the left image (IL) is canceled by the distortion of the eyepiece optical system (4L), and thus the left image (JL) is displayed with 0% distortion (i.e. the screen is rectangular) in the left eye (EL).

On the other hand, when the right image (IR) is displayed on the liquid crystal display device (1), the liquid crystal shutter (5R) for the right eye (ER) is open (i.e. the image light is transmitted), and the liquid crystal shutter (5L) for the left eye (EL) is closed (i.e. the image light is intercepted). Thus, now, only the right image (JR) is observed only by the right eye (ER). Since the right image (IR) displayed on the liquid crystal display device (1) has opposite distortion to the distortion occurring between the liquid crystal display device (1) and the right eye (ER) (i.e. the distortion caused by the eyepiece optical system (4R)), when this image is observed through the eyepiece optical system (4R), the distortion of the right image (IR) is canceled by the distortion of the eyepiece optical system (4R), and thus the right image (JR) is displayed with 0% distortion (i.e. the screen is rectangular) in the right eye (ER).

As described above, by switching the left and right images (IL, IR) and switching the optical paths in a synchronous and time-divisional fashion, and in addition by giving the images (IL, IR) displayed on the liquid crystal display device (1) opposite distortion to the laterally opposite distortion occurring in the eyepiece optical systems (4L, 4R), respectively, it is possible to make the images (JL, JR) displayed in the left and right eyes have identical distortion. With identical distortion in the left and right images (JL, JR) displayed in the left and right eyes (EL, ER), the observer's eyes (EL, ER) can merge the two images with ease, which makes the use of the apparatus less eye-straining. Here, simply making the left and right images (JL, JR) have identical distortion is sufficient to make image merging easy; that is, the distortion dose not necessarily have to be made 0%. The above-described control configuration (FIG. 8) can be used also in the other embodiments (FIGS. 2, 3, 4A, 4B, 5, 6, and 7) described later to display two-dimensional images.

Next, the control configurations used to display a three-dimensional image in an observer's eyes (EL, ER) will be explained. As described earlier, in the configuration that switches the left and right images (IL, IR) and the optical paths time-divisionally in synchronism, if the left and right images (JL, JR) are given parallax, the observer can observe a three-dimensional image (i.e. stereoscopic image) by merging the two images in the observer's eyes (EL, ER). To give the displayed left and right images (JL, JR) parallax, the image signal fed in has only to be a three-dimensional image signal that contains parallax information associated with the observer's left and right eyes (EL, ER). Therefore, simply by adding a slight modification to the above-described control configuration (FIG. 8), it is possible to readily display a three-dimensional image. The control configurations described below can be used also in the other embodiments (FIGS. 2, 3, 4A, 4B, 5, 6, and 7) described later to display a three-dimensional image (FIGS. 9 and 10).

Figure 9:
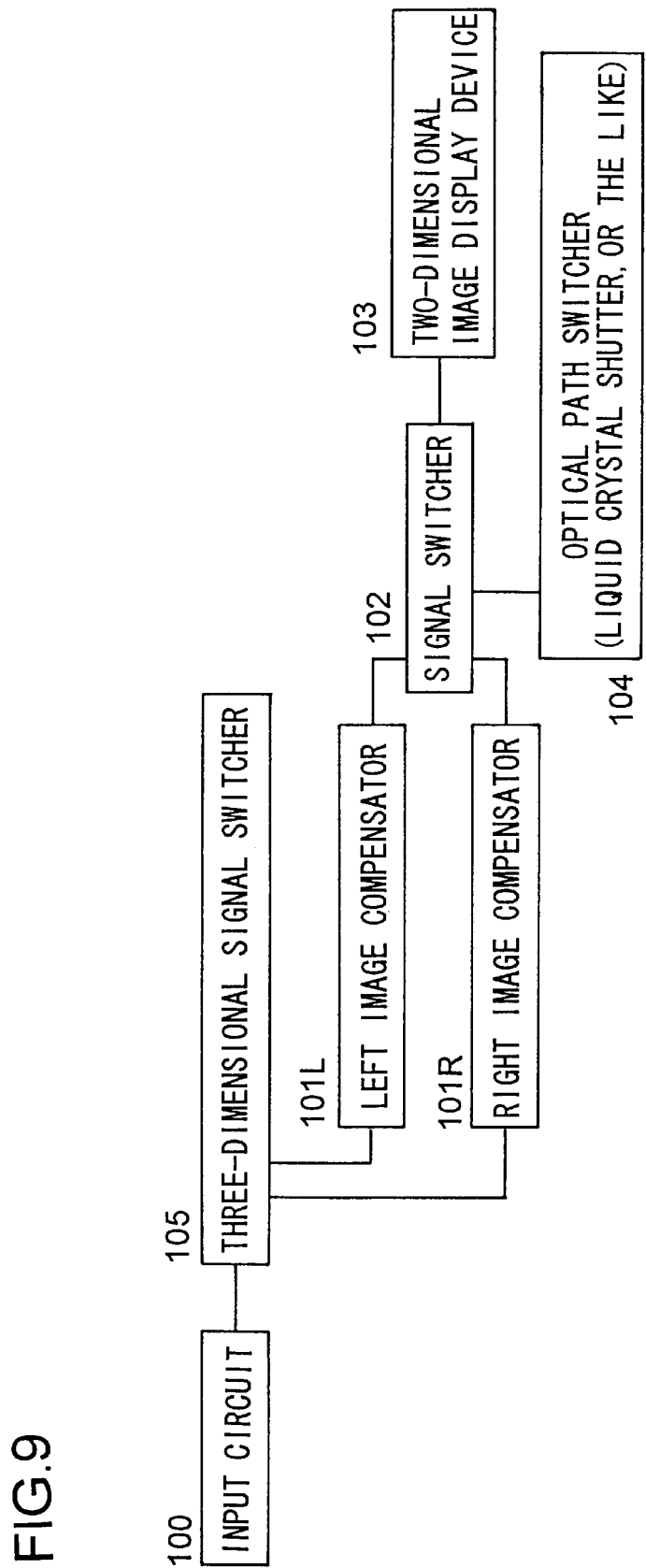
FIG. 9 is a block diagram illustrating a control configuration for displaying a three-dimensional image by a field sequential input method.

FIG. 9 shows a control configuration used to display a three-dimensional image by a field sequential input method. The image signal fed in to an input circuit (100) is a three-dimensional image signal containing parallax information conforming to a field sequential input method. The three-dimensional image is composed of a two-dimensional left image signal corresponding to the left image and a two-dimensional right image signal corresponding to the right image, and these left and right image signals are alternately fed to the input circuit (100). The left and right image signals acquired through the input circuit (100) are separated by a three-dimensional signal switcher (105) and then fed to a left image compensator (101L) and a right image compensator (101R). The following operations are performed in the same manner as in the previously described control configuration (FIG. 8).

Figure 10:
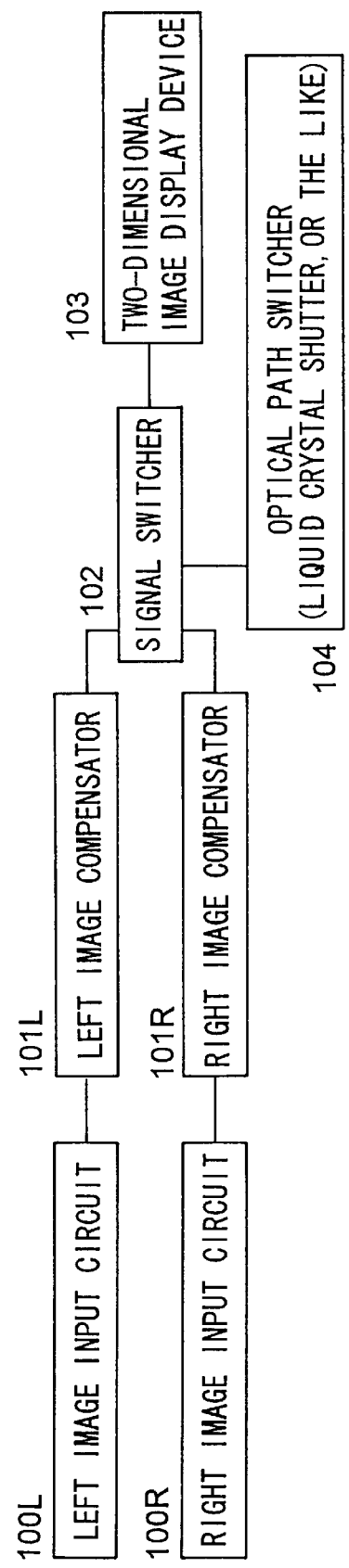
FIG. 10 is a block diagram illustrating a control configuration for displaying a three-dimensional image by a method based on independent input of left and right images.

FIG. 10 shows a control configuration used to display a three-dimensional image by a method based on separate input of left and right images. In this case, as a three-dimensional image signal containing parallax information, two independent signals are used: a left two-dimensional image signal corresponding to the left image and a right two-dimensional image signal corresponding to the right image. Therefore, the input portion is also composed of two independent left and right image input circuits (100L, 100R). To the left image input circuit (100L), the two-dimensional left image signal corresponding to the left image is fed, and to the right image input circuit (100R), the two-dimensional right image signal corresponding to the right image is fed. Then, the left and right image signals acquired through the individual image input circuits (100L, 100R) are fed to a left image compensator (101L) and a right image compensator (101R), respectively. The following operations are performed in the same manner as in the previously described control configuration (FIG. 8).

Figure 2:
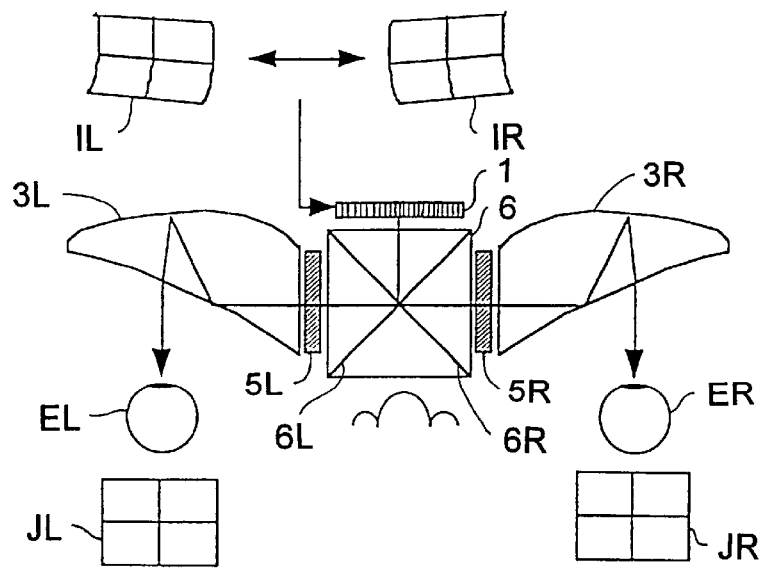
FIG. 2 is an optical construction diagram schematically illustrating the outline of the construction of a second embodiment of the invention.

Second Embodiment (FIG. 2)

FIG. 2 shows the optical construction of a second embodiment of the invention. The distinctive feature of this image display apparatus is that a cross prism (6) for separating the image light horizontally in the leftward and rightward directions is disposed between a liquid crystal display device (1) and eyepiece optical systems (3L, 3R). This cross prism (6) has, like the one used in the comparative example (FIG. 11), two semi-transmissive surfaces (6L, 6R) arranged so as to cross each other. The image light exiting from the liquid crystal display device (1) is separated horizontally in the leftward and rightward directions by the two semi-transmissive surfaces (6L, 6R) of the cross prism (6). Then, the image light thus separated by the cross prism (6) enters liquid crystal shutters (5L, 5R) that operate in the same way as in the first embodiment (FIG. 1) described previously. In this embodiment, the liquid crystal shutters (5L, 5R) are disposed between the cross prism (6) and the individual eyepiece optical systems (3L, 3R); however, the liquid crystal shutters (5L, 5R) may be disposed elsewhere as long as they are disposed somewhere in the optical paths between the cross prism (6) and an observer's left and right eyes (EL, ER).

The image light having passed through the liquid crystal shutters (5L, 5R) enters the pair of left and right eyepiece optical systems (3L, 3R), and are then directed to the observer's left and right eyes (EL, ER) by the individual eyepiece optical systems (3L, 3R). As described earlier, the eyepiece optical systems (3L, 3R) are both built as a uniaxially decentered prism optical system that is not axi-symmetric horizontally, and they are decentered in laterally opposite directions. Therefore, in the left and right eyepiece optical systems (3L, 3R), distortion occurs in laterally opposite directions. However, owing to the previously described control configurations (FIGS. 8 to 10), the left and right images (JL, JR) eventually displayed as virtual images in the observer's eyes (EL, ER) have identical distortion (0% distortion).

In other words, as in the first embodiment (FIG. 1) described previously, by switching the left and right images (IL, IR) and switching the optical paths in a synchronous and time-divisional fashion, and in addition by giving the images (IL, IR) displayed on the liquid crystal display device (1) opposite distortion to the laterally opposite distortion occurring between the liquid crystal display device (1) and the observer's eyes (EL, ER), respectively, (i.e. the distortion occurring in the optical system including the eyepiece optical system (3L, 3R)), it is possible to make the observed left and right images (JL, JR) have identical distortion.

Figure 3:
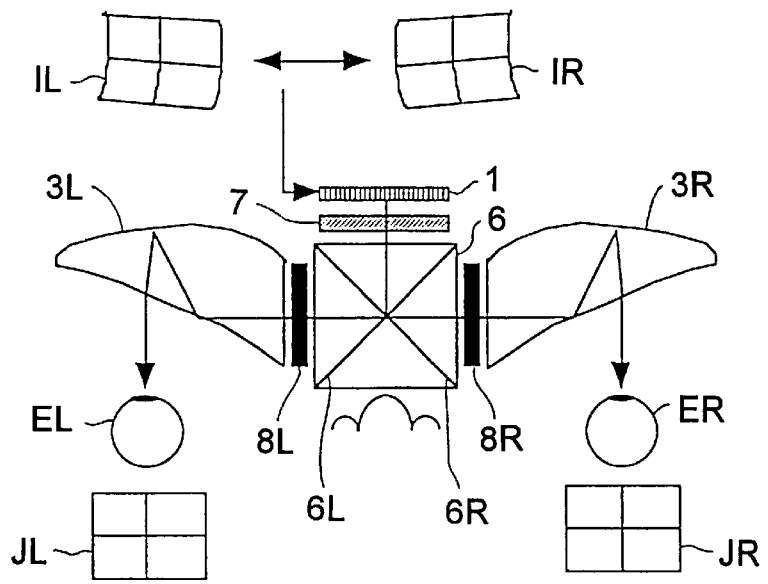
FIG. 3 is an optical construction diagram schematically illustrating the outline of the construction of a third embodiment of the invention.

Third Embodiment (FIG. 3)

FIG. 3 shows the optical construction of a third embodiment of the invention. This image display apparatus is characterized by the method it uses to switch optical paths, and is provided with, as an optical path switcher (104, FIGS. 8 to 10), a liquid crystal polarization conversion device (7) and a pair of left and right polarizing plates (8L, 8R). Furthermore, the image light exiting from a liquid crystal display device (1) is polarized in a specific manner (here, linearly polarized), and the optical paths are switched in accordance with the relationship between the polarization direction of the image light and the polarization axes of the polarizing plates (8L, 8R). Instead of the liquid crystal display device (1), any other two-dimensional image display device (103, FIGS. 8 to 10) may be used as long as it emits image light polarized in a specific manner.

The liquid crystal polarization conversion device (7) is a polarization conversion device for time-divisionally converting the polarization direction of the incident image light by 90°, and is disposed between the liquid crystal display device (1) and a cross prism (6). The liquid crystal polarization conversion device (7) may be disposed elsewhere as long as it is disposed somewhere between the liquid crystal display device (1) and eyepiece optical systems (3L, 3R). However, in this embodiment, because the image light is separated by the cross prism (6), to convert the polarization direction with a single liquid crystal polarization conversion device (7), it is preferable that the liquid crystal polarization conversion device (7) be disposed in the optical path before the image light is separated by the cross prism (6).

The polarizing plate (8L) for the left eye (EL) is disposed between the cross prism (6) and the eyepiece optical system (3L), and the polarizing plate (8R) for the right eye (ER) is disposed between the cross prism (6) and the eyepiece optical system (3R). These two polarizing plates (8L, 8R) are arranged perpendicularly to the optical axis with their polarizing axes perpendicular to each other. The polarizing plates (8L, 8R) may be disposed elsewhere as long as they are disposed somewhere in the optical paths between the liquid crystal polarization conversion device (7) and the observer's left and right eyes (EL, ER).

The liquid crystal polarization conversion device (7), in synchronism with the switching of the image signal output from the signal switcher (102, FIGS. 8 to 10), time-divisionally converts the polarization direction of the image light exiting from the liquid crystal display device (1) by 90°. Thus, the image light exiting from the liquid crystal polarization conversion device (7) has its polarization direction switched alternately between two mutually perpendicular directions. The image light exiting from the liquid crystal polarization conversion device (7) are separated horizontally in leftward and rightward directions by the two semi-transmissive surfaces (6L, 6R) of the cross prism (6), then enters the individual polarizing plates (8L, 8R). The two polarizing plates (8L, 8R) are arranged with their polarizing axes perpendicular to each other, so that the image light is transmitted through either the two polarizing plates (8L, 8R) at a time, and enters the eyepiece optical systems (3L, 3R). Therefore, in synchronism with the display of two-dimensional images (IL, IR), a state in which only the left image (JL) is displayed only in the left eye (EL) and a state in which only the right image (JR) is displayed only in the right eye (ER) alternate. In this embodiment, because the device that functions as the signal switcher (102) is a single liquid crystal polarization conversion device (7), it is possible to realize the image display apparatus at lower cost than in the first and second embodiments (FIGS. 1 and 2) described previously, in which two liquid crystal shutters (5L, 5R) are used.

The operation of the individual components will be explained in more detail. When the left image (IL) is displayed on the liquid crystal display device (1), the polarization direction of the image light exiting from the liquid crystal polarization conversion device (7) is identical with the polarization direction in which the image light is transmitted through the polarizing plate (8L) for the left eye (EL) (i.e. the polarization direction in which the image light is intercepted by the polarizing plate (8R) for the right eye (ER)). Therefore, only the left image (JL) is observed only by the left eye (EL). Since the left image (IL) displayed on the liquid crystal display device (1) is given distortion opposite to the distortion occurring between the liquid crystal display device (1) and the left eye (EL) (i.e. the distortion occurring in the optical system including the eyepiece optical system (3L) and other components), when this image is observed through the eyepiece optical system (3L), the distortion of the left image (IL) is canceled by the distortion of the eyepiece optical system (3L) and other components, and thus the left image (JL) is displayed with 0% distortion (i.e. the screen is rectangular) in the left eye (EL).

On the other hand, when the right image (IR) is displayed on the liquid crystal display device (1), the polarization direction of the image light exiting from the liquid crystal polarization conversion device (7) is identical with the polarization direction in which the image light is transmitted through the polarizing plate (8R) for the right eye (ER) (i.e. the polarization direction in which the image light is intercepted by the polarizing plate (8L) for the left eye (EL)). Therefore, only the right image (JR) is observed only by the right eye (ER). Since the right image (IR) displayed on the liquid crystal display device (1) is given distortion opposite to the distortion occurring between the liquid crystal display device (1) and the right eye (ER) (i.e. the distortion occurring in the optical system including the eyepiece optical system (3R) and other components), when this image is observed through the eyepiece optical system (3R), the distortion of the right image (IR) is canceled by the distortion of the eyepiece optical system (3R) and other components, and thus the right image (JR) is displayed with 0% distortion (i.e. the screen is rectangular) in the right eye (ER).

Figure 4A:
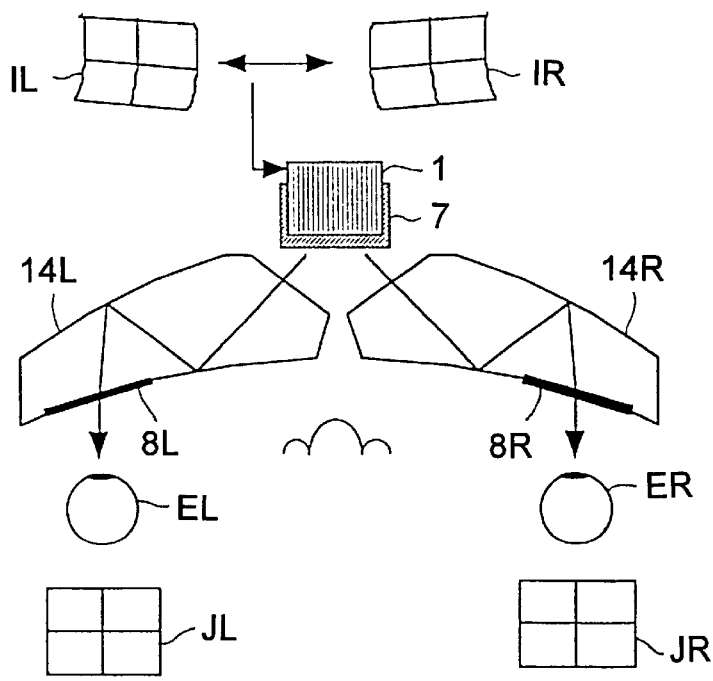
FIGS. 4A and 4B are optical construction diagrams schematically illustrating the outline of the construction of a fourth embodiment of the invention.
Figure 4B:
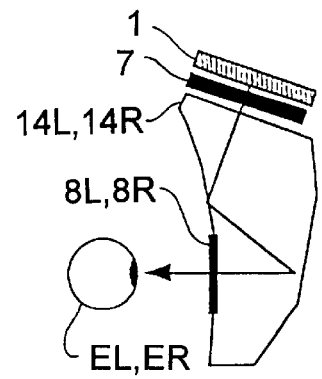

Fourth Embodiment (FIGS. 4A and 4B)

FIGS. 4A and 4B show the optical construction of a fourth embodiment of the invention. FIG. 4A is a top view of the optical construction of this embodiment and FIG. 4B is a side view thereof. The distinctive feature of this image display apparatus is that a pair of left and right eyepiece optical systems (14L, 14R) are both built as a biaxially decentered prism optical system that is not axisymmetric either horizontally or vertically. Thus, they are decentered in laterally opposite directions, and therefore, in the individual eyepiece optical systems (14L, 14R), distortion occurs in laterally opposite directions. However, owing to the control configurations (FIGS. 8 to 10) similar to those used in the embodiments (FIGS. 1 to 3) described previously, the left and right images (JL, JR) eventually displayed as virtual images in the observer's eyes (EL, ER) have identical distortion (0% distortion). Here, distortion due to the eyepiece optical systems (14L, 14R) being decentered in upward and downward directions also occurs; however, in this respect, they are decentered in laterally identical directions, and therefore the resulting distortion does not hamper image merging in the observer's eyes (EL, ER).

As in the third embodiment (FIG. 3) described previously, the image display apparatus of this embodiment is provided with a liquid crystal display device (1) that emits light polarized in a specific manner as image light, and, as an optical path switcher (104, FIGS. 8 to 10), a liquid crystal polarization conversion device (7) and a pair of left and right polarizing plates (8L, 8R). Here, the liquid crystal polarization conversion device (7) and the pair of left and right polarizing plates (8L, 8R) switch the left and right images (IL, IR) and the optical paths in a synchronous and time-divisional fashion in the same manner as in the third embodiment (FIG. 3) described previously. It is of course possible to use liquid crystal shutters (5L, 5R in FIGS. 1 and 2) serving as an optical path switcher (104, FIGS. 8 to 10) in combination with the eyepiece optical systems (14L, 14R). In that case, the image light exiting from the liquid crystal display device (1) does not necessarily have to be polarized in a specific manner. In this embodiment, no cross prism (6) is used to separate the image light, and this makes it possible to realize the image display apparatus at lower cost than in the third embodiment (FIG. 3) described previously. Furthermore, the liquid crystal display device (1) and the liquid crystal polarization conversion device (7) are disposed above the eyepiece optical systems (14L, 14R), and this makes it easy to make the entire apparatus compact.

Figure 5:
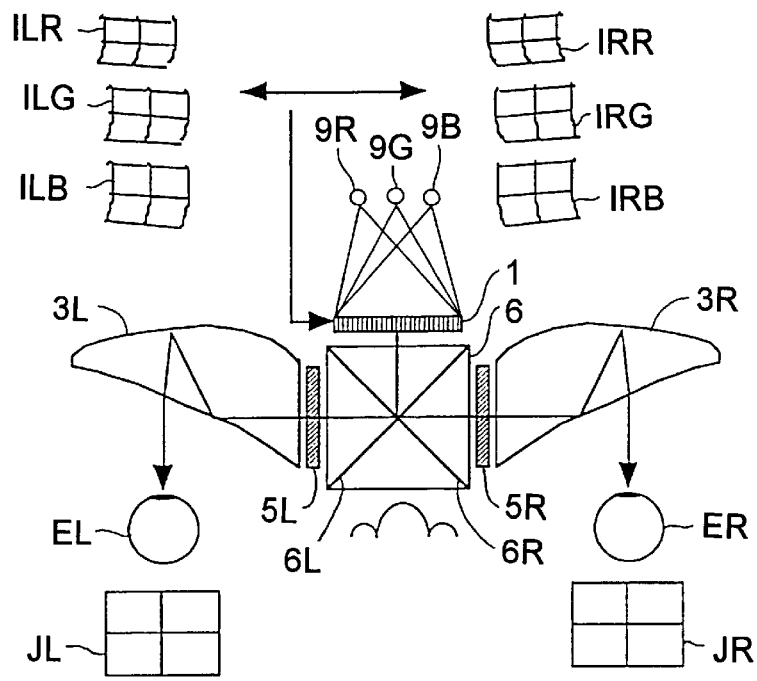
FIG. 5 is an optical construction diagram schematically illustrating the outline of the construction of a fifth embodiment of the invention.

Fifth Embodiment (FIG. 5)

FIG. 5 shows the optical construction of a fifth embodiment of the invention. The distinctive feature of this image display apparatus is that it is so configured as to display color images. In other respects, the optical construction here is basically the same as that of the second embodiment (FIG. 2) described earlier. The optical construction here is characterized in that a transmission-type liquid crystal display device (1) is used, and in that three types of LEDs (9R, 9G, 9B) for illuminating the liquid crystal display device (1) with light of three primary colors, namely R, G, and B, are arranged as a backlight thereof. Here, a case in which the LEDs (9R, 9G, 9B) emit illumination light of different colors time-divisionally in order of R, G, and B will be described; however, in a case where a liquid crystal display device (1) is illuminated with light of different colors time-divisionally, it is also possible to display color images by lighting the plurality of types of LEDs (9R, 9G, 9B) simultaneously. Alternatively, a combination of a white light source and a color wheel may be used to illuminate the liquid crystal display device (1), or a self illuminating element (such as a plasma display device, an LED display device, or a CRT) which emits light of three primary colors (RGB) may be used as a two-dimensional image display device (103, FIGS. 8 to 10) instead of the liquid crystal display device (1). In this case, no backlight is necessary.

When the liquid crystal display device (1) is illuminated by the LEDs (9R, 9G, 9B) and image light exits from the liquid crystal display device (1), the image light is separated horizontally in leftward and rightward directions by the two semi-transmissive surfaces (6L, 6R) of a cross prism (6), and then enters liquid crystal shutters (5L, 5R). The image light having passed through the liquid crystal shutters (5L, 5R) enters the pair of left and right eyepiece optical systems (3L, 3R), and is then directed to an observer's left and right eyes (EL, ER) by the individual eyepiece optical systems (3L, 3R). As described earlier, the eyepiece optical systems (3L, 3R) are both built as a uniaxially decentered prism optical system that is not axisymmetric horizontally, and they are decentered in laterally opposite directions. Therefore, in the left and right eyepiece optical systems (3L, 3R), distortion occurs in laterally opposite directions.

However, owing to the previously described control configurations (FIGS. 8 to 10), the left and right images (JL, JR) eventually displayed as virtual images in the observer's eyes (EL, ER) have identical distortion (0% distortion). In addition, the control configuration used here is adapted to display color images, and thus permits also the lateral chromatic aberration occurring in the eyepiece optical systems (3L, 3R) and other components to be corrected. The distinctive feature of a control configuration adapted to display color images is that the image signal (or each of the image signals) fed in to the input circuit (100, or 100L and 100R in FIGS. 8 to 10) is a signal containing three primary-color, namely R, G, and B, components, and that, to make the RGB images (JL, JR) displayed in the observer's eyes (EL, ER) have identical distortion, image compensators (101L, 101R in FIGS. 8 to 10) electrically compensate the image signal for distortion independently for the R, G, and B components before outputting the R, G, and B image signals.

The control configuration used to display a two-dimensional color image in the observer's eyes (EL, ER) will be explained with reference to FIG. 8. When the two-dimensional image signal containing three primary-color (namely, R, G, and B) components is fed from the input circuit (100) to the left and right image compensators (101L, 101R), the individual image compensators (101L, 101R) electrically compensate the image signal for distortion so that the left and right RGB images (JL, JR) displayed in the observer's left and right eyes (EL, ER) have identical distortion (i.e. so that all the six images have 0% distortion), and then output left and right RGB image signals corresponding to the left and right RGB images (ILR, ILG, ILB, IRR, IRG, IRB). Through this distortion compensation, the two-dimensional RGB images (ILR, ILG, ILB, IRR, IRG, IRB) displayed are given opposite distortion to that occurring between the two-dimensional image display device (103) and the observer's eyes (EL, ER) (i.e. the distortion caused by the eyepiece optical systems (3L, 3R) and other components). That is, the two-dimensional images (ILR, ILG, ILB, IRR, IRG, IRB) displayed include distortion that reduces the difference in distortion between the left and right images and the difference in distortion among the R, G, and B images (i.e. lateral chromatic aberration).

A signal switcher (102) switches between the left and right RGB image signals output from the individual image compensators (101L, 101R) so as to output them alternately chronologically. The two-dimensional image display device (103) corresponding to the liquid crystal display device (1) displays two-dimensional images (ILR, ILG, ILB, IRR, IRG, IRB) in accordance with the RGB image signals received from the signal switcher (102). That is, the two-dimensional image display device (103) displays two distortion-compensated two-dimensional images (ILR, ILG, ILB, IRR, IRG, IRB) time-divisionally and alternately for each of R, G, and B (for example, ILR, then IRR, then ILG, then IRG, then ILB, then IRB, then ILR, and so forth).

An optical path switcher (104), in synchronism with the switching between the left and right image signals output from the signal switcher (102), time-divisionally switches optical paths from the two-dimensional image display device (103) to the observer's eyes (EL, ER) so that R, G, or B image light enters either the left or right eye of the observer (EL, ER) at a time. In this embodiment, two liquid crystal shutters (5L, 5R) are opened and closed in synchronism with the display of the two-dimensional images (ILR, ILG, ILB, IRR, IRG, IRB), and three types of LEDs (9R, 9G, 9B) emit light of different colors time-divisionally in order of R, G, and B. Thus, a state in which only the left image (JL) is displayed only in the left eye (EL) and a state in which only the right image (JR) is displayed only in the right eye (ER) alternate, successively in order of R, G, and B.

The operation of the individual blocks will be explained in more detail below. When the left R, G, or B image (ILR, ILG, ILB) is displayed on the liquid crystal display device (1), the LED (9R, 9G, 9B) of the corresponding color emits light. At this time, the liquid crystal shutter (5L) for the left eye (EL) is open (the image light is transmitted) and the liquid crystal shutter (5R) for the right eye (ER) is closed (the image light is intercepted). Thus, now, only the left image (JL) of the corresponding color is observed only by the left eye (EL). Since the left image (ILR, ILG, ILB) displayed on the liquid crystal display device (1) has opposite distortion to the distortion occurring between the liquid crystal display device (1) and the left eye (EL), when this image is observed through the eyepiece optical system (3L), the distortion of the left image (ILR, ILG, ILB) is canceled by the distortion of the eyepiece optical system (3L), and thus any of the left R, G, and B images (JL) is displayed with 0% distortion (i.e. the screen is rectangular) in the left eye (EL).

On the other hand, when the right R, G, or B image (IRR, IRG, IRB) is displayed on the liquid crystal display device (1), the LED (9R, 9G, 9B) of the corresponding color emits light. At this time, the liquid crystal shutter (5R) for the right eye (ER) is open (the image light is transmitted) and the liquid crystal shutter (5L) for the left eye (EL) is closed (the image light is intercepted). Thus, now, only the right image (JR) of the corresponding color is observed only by the right eye (ER). Since the right image (IRR, IRG, IRB) displayed on the liquid crystal display device (1) has opposite distortion to the distortion occurring between the liquid crystal display device (1) and the right eye (ER), when this image is observed through the eyepiece optical system (3R), the distortion of the right image (IRR, IRG, IRB) is canceled by the distortion of the eyepiece optical system (3R), and thus any of the right R, G, and B images (JR) is displayed with 0% distortion (i.e. the screen is rectangular) in the right eye (ER).

As described above, by switching the left R, G, and B and right R, G, and B images (ILR, ILG, ILB, IRR, IRG, IRB) and switching the optical paths (including the switching of illumination light) in a synchronous and time-divisional fashion, and in addition by giving the left R, G, and B and right R, G, and B images (ILR, ILG, ILB, IRR, IRG, IRB) displayed on the liquid crystal display device (1) opposite distortion to the laterally opposite distortion occurring in the eyepiece optical systems (3L, 3R) and other components, respectively, for each of R, G, and B, it is possible to make the images (JL, JR) displayed in the left and right eyes have identical distortion. With identical distortion in the left and right images (JL, JR) displayed in the left and right eyes (EL, ER), the observer's eyes (EL, ER) can merge the two images with ease, which makes the use of the apparatus less eye-straining. Furthermore, with identical distortion in the R, G, and B images (JL, JR), it is possible to observe a color image free from lateral chromatic aberration. This makes it possible to correct the left and right images (JL, JR) also for lateral chromatic aberration, and the resulting improved quality of the color image obtained makes image merging easier. Here, simply making the left and right images (JL, JR) have identical distortion is sufficient to make image merging easy; that is, the distortion dose not necessarily have to be made 0%.

It is also possible to display three-dimensional color images by using the control configurations for displaying a three-dimensional image (FIGS. 9 and 10) described earlier. The configuration used in this embodiment, i.e. one adapted to display color images, is readily applicable also to the first, third, and fourth embodiments (FIGS. 1, 3, 4A, and 4B) previously described. For example, also in a case where a liquid crystal polarization conversion device (7) and a pair of left and right polarizing plates (8L, 8R) are used as an optical path switcher (104, FIGS. 8 to 10), or in a case where eyepiece optical systems (14L, 14R) that are not axisymmetric either horizontally or vertically are used, it is possible to obtain color images as readily as in this embodiment. The same is true also with an optical construction in which no cross prism (6) is used.

Figure 6:
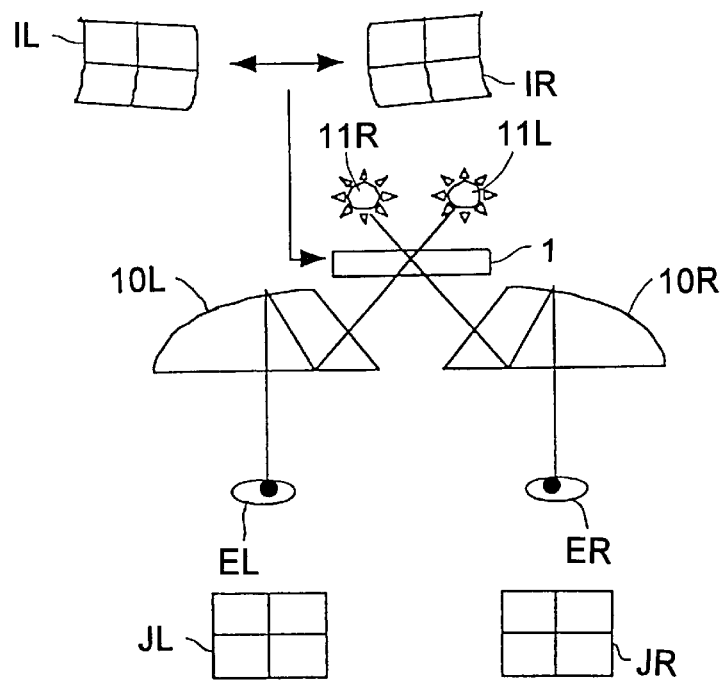
FIG. 6 is an optical construction diagram schematically illustrating the outline of the construction of a sixth embodiment of the invention.
Figure 7:
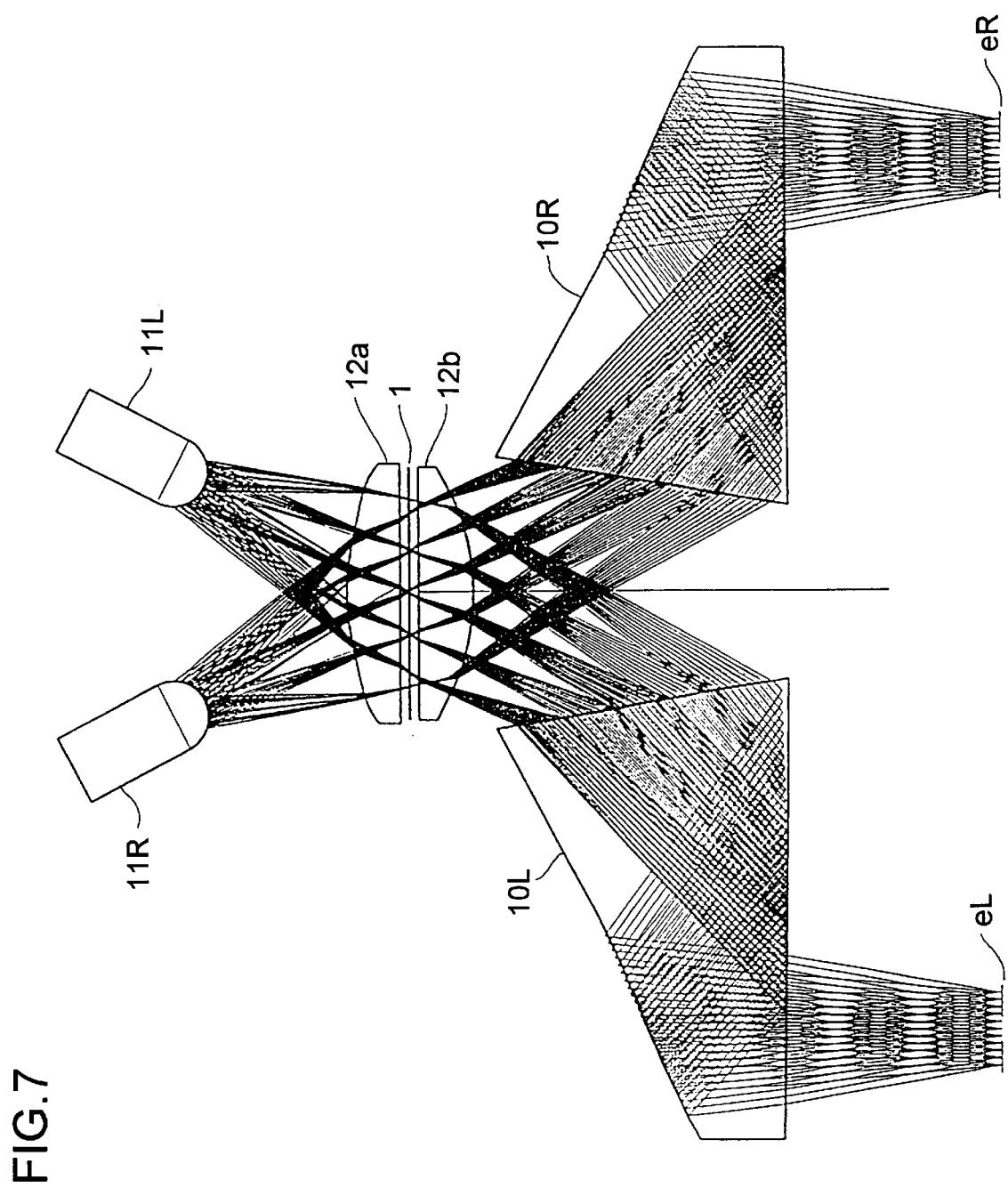
FIG. 7 is an optical path diagram illustrating the optical paths from the illumination light source to the left and right eyes in the sixth embodiment.

Sixth Embodiment (FIGS. 6 and 7)

FIG. 6 shows the optical construction of a sixth embodiment of the invention, and FIG. 7 shows the optical construction thereof in more detail with the optical paths. This image display apparatus is provided with a single liquid crystal display device (1), a pair of left and right eyepiece optical systems (10L, 10R), and a pair of left and right illumination light sources (11L, 11R). And this image display apparatus is characterized by the method it uses to switch optical paths. The optical construction here is characterized in that a transmission-type liquid crystal display device (1) is used, and in that the illumination light sources (11L, 11R) arranged as a backlight of the liquid crystal display device (1) are designed as directional light sources. The two illumination light sources (11L, 11R) are white light sources that time-divisionally and alternately go on and off to illuminate the liquid crystal display device (1) from oblique directions, thus serving as the optical path switchers (104, FIGS. 8 to 10).

As the illumination light sources (11L, 11R), LEDs are desirable; however, any illumination means, such as a white-light lamp, may be used as long as it can be switched between on and off at high speed. Alternatively, it is also possible to use an illumination means that time-divisionally and alternately goes on and off by switching illumination light on and off with a liquid crystal shutter, through rotation or inclination of a mirror, or with a light-intercepting wheel having portions thereof cut off. In FIG. 7, reference numerals 12a and 12b represent a first and a second condenser lens, and reference symbols eL and eR represent the pupils of the left and right eyes (EL, ER). The eyepiece optical systems (10L, 10R) direct the image light to the pupils (eL, eR) by using the power of diffractive optical surfaces.

When the liquid crystal display device (1) is illuminated by the illumination light sources (11L, 11R) and image light exits from the liquid crystal display device (1), the image light enters a left or a right eyepiece optical system (10L, 10R), and is directed to an observer's left and right eyes (EL, ER). The eyepiece optical systems (10L, 10R) are both built as a uniaxially decentered prism optical system that is not axisymmetric horizontally, and they are decentered in laterally opposite directions. Therefore, in the left and right eyepiece optical systems (10L, 10R), distortion occurs in laterally opposite directions. However, owing to the control configurations (FIGS. 8 to 10) similar to those used in the first embodiment described earlier, the left and right images (JL, JR) eventually displayed as virtual images in the observer's eyes (EL, ER) have identical distortion (0% distortion).

The distinctive feature of the control configuration used here to switch optical paths is that the two illumination light sources (11L, 11R) time-divisionally and alternately go on and off to illuminate the liquid crystal display device (1), and that the image light exiting from the liquid crystal display device (1) as a result of the liquid crystal display device (1) being illuminated by the illumination light source (11L) enters only the exit pupil of the eyepiece optical system (10L) for the left eye (EL) and the image light exiting from the liquid crystal display device (1) as a result of the liquid crystal display device (1) being illuminated by the illumination light source (11R) enters only the exit pupil of the eyepiece optical system (10R) for the right eye (ER). When the two illumination light sources (11L, 11R) go on and off in synchronism with the switching between the left and right image signals output from the signal switcher (102, FIGS. 8 to 10) (and thus between the left and right images displayed), optical paths from the liquid crystal display device (1) to the observer's eyes (EL, ER) are time-divisionally switched so that the image light enters either the left or right eye (EL, ER) of the observer at a time. Therefore, a state in which only the left image (JL) is displayed only in the left eye (EL) and a state in which only the right image (JR) is displayed only in the right eye (ER) alternate.

The operation of the individual components will be explained in more detail. When the left image (IL) is displayed on the liquid crystal display device (1), the illumination light source (11L) for the left eye (EL) is on, and the illumination light source (11R) for the right eye (ER) is off. The illumination light source (11L) is directional, and therefore only the left image (JL) is observed only by the left eye (EL). Since the left image (IL) displayed on the liquid crystal display device (1) is given distortion opposite to the distortion occurring between the liquid crystal display device (1) and the left eye (EL) (i.e. the distortion occurring in the eyepiece optical system (10L)), when this image is observed through the eyepiece optical system (10L), the distortion of the left image (IL) is canceled by the distortion of the eyepiece optical system (10L), and thus the left image (JL) is displayed with 0% distortion (i.e. the screen is rectangular) in the left eye (EL).

On the other hand, when the right image (IR) is displayed on the liquid crystal display device (1), the illumination light source (11R) for the right eye (ER) is on, and the illumination light source (11L) for the left eye (EL) is off. The illumination light source (11R) is directional, and therefore only the right image (JR) is observed only by the right eye (ER). Since the right image (IR) displayed on the liquid crystal display device (1) is given distortion opposite to the distortion occurring between the liquid crystal display device (1) and the right eye (ER) (i.e. the distortion occurring in the eyepiece optical system (10R)), when this image is observed through the eyepiece optical system (10R), the distortion of the right image (IR) is canceled by the distortion of the eyepiece optical system (10R), and thus the right image (JR) is displayed with 0% distortion (i.e. the screen is rectangular) in the right eye (ER).

According to the construction of this embodiment, it is possible to share a single image between the left and right eyes (EL, ER) simply by switching the illumination light sources (11L, 11R) between on and off. Thus, there is no need to use liquid crystal shutters (5L, 5R) or the like, and this helps make the construction simpler and the cost lower accordingly. In addition, because no cross prism (6) is used in this embodiment, it is possible to reduce the cost of the apparatus accordingly. However, a cross prism (6) may be disposed in the optical path, even in which case the method for switching optical paths used in this embodiment is readily applicable. In this embodiment, the eyepiece optical systems (10L, 10R) may be axisymmetric horizontally. Alternatively, instead of the eyepiece optical systems (10L, 10R), eyepiece optical systems (14L, 14R in FIGS. 4A and 4B) that are not axisymmetric either horizontally or vertically may be used.

What is claimed is:

1. An image display apparatus comprising:
    a signal input portion for receiving an image signal;
    an image compensator for electrically compensating the image signal for distortion so that a left image and a right image displayed in an observer's left and right eyes have identical distortion and for outputting a left image signal and a right image signal that correspond to the left and right images;
    a signal switcher for switching between the left and right image signals output from the image compensator so as to output the left and right images alternately chronologically;
    a single two-dimensional image display device for displaying a two-dimensional image in accordance with the image signal output from the signal switcher;
    a pair of left and right eyepiece optical systems for directing image light exiting from the two-dimensional image display device to the observer's left and right eyes so that the two-dimensional image is displayed as a virtual image in the observer's eyes; and
    an optical path switcher for time-divisionally switching optical paths from the two-dimensional image display device to the observer's eyes in synchronism with switching between the left and right image signal output from the signal switcher so that the image light enters either the observer's left or right eye at a time.

2. An image display apparatus as claimed in claim 1, wherein the pair of left and right eyepiece optical systems are both so constructed as not to be axisymmetric horizontally.

3. An image display apparatus as claimed in claim 2, further comprising:
    a cross prism, disposed between the two-dimensional image display device and the eyepiece optical systems, for separating the image light horizontally in leftward and rightward directions.

4. An image display apparatus as claimed in claim 1, wherein the pair of left and right eyepiece optical systems are both so constructed as not to be axisymmetric either horizontally or vertically.

5. An image display apparatus as claimed in claim 1,
wherein the optical path switcher is a pair of liquid crystal shutters disposed in the optical paths from the two-dimensional image display device to the observer's left and right eyes.

6. An image display apparatus as claimed in claim 1,
wherein the image light exiting from the two-dimensional image display device is polarized in a specific manner, and the optical path switcher is composed of a polarization conversion device, disposed between the two-dimensional image display device and the eyepiece optical systems, for time-divisionally converting a polarization direction of the image light, and a pair of left and right polarizing plates disposed between the polarization conversion device and the observer's left eye and between the polarization conversion device and the observer's right eye, respectively, with their polarization axes perpendicular to each other.

7. An image display apparatus as claimed in claim 1,
wherein the optical path switcher is composed of a first illuminator and a second illuminator that time-divisionally and alternately illuminate the two-dimensional image display device, so that the image light exiting from the two-dimensional image display device when illuminated by the first illuminator enters only the eyepiece optical system for the left eye, and that the image light exiting from the two-dimensional image display device when illuminated by the second illuminator enters only the eyepiece optical system for the right eye.

8. An image display apparatus as claimed in claim 1,
wherein the image signal fed into the signal input portion is a three-dimensional image signal containing parallax information associated with the observer's left and right eyes.

9. An image display apparatus as claimed in claim 8,
wherein the image signal fed into the signal input portion is a three-dimensional image signal containing parallax information conforming to a field sequential input method.

10. An image display apparatus as claimed in claim 1,
wherein the image signal fed into the signal input portion is an image signal containing three primary-color, namely R, G, and B, components, and, to make distortion of R, G, and B images perceived by the observer eyes identical, the image compensator electrically compensates the image signal for distortion independently for the R, G, and B components and then outputs R, G, and B image signals.

11. An image display apparatus comprising:
an image compensator for electrically modifying an image signal to compensate for a difference between a left image distortion and a right image distortion that would otherwise be observed by an observer, so that a left image observed by the observer's left eye and a right image observed by the observer's right eye have identical distortion, the image compensator outputting a left image signal corresponding to the left image and a right image signal corresponding to the right image;
a signal switcher for switching between the left and right image signals output from the image compensator so as to alternately output the left and right image signals;
a single two-dimensional image display device for displaying a two-dimensional image in accordance with the image signal output from the signal switcher;
a left eyepiece optical system and a right eyepiece optical system for directing image light exiting from the two-dimensional image display device to the observer's left and right eyes, respectively, so that the two-dimensional image is observed as a virtual image in the observer's eyes; and
an optical path switcher for time-divisionally switching optical paths from the two-dimensional image display device to the observer's eyes in synchronism with switching between the left image signal and right image signal output from the signal switcher so that the image light enters either the observer's left or right eye at a time.

12. An image display apparatus as claimed in claim 11,
wherein the pair of left and right eyepiece optical systems are both so constructed as not to be axisymmetric horizontally.

13. An image display apparatus as claimed in claim 11, further comprising:
a cross prism, disposed between the two-dimensional image display device and the eyepiece optical systems, for separating the image light horizontally in leftward and rightward directions.

14. An image display apparatus as claimed in claim 11,
wherein the pair of left and right eyepiece optical systems are both so constructed as not to be axisymmetric either horizontally or vertically.

15. An image display apparatus as claimed in claim 11,
wherein the optical path switcher is a pair of liquid crystal shutters disposed in the optical paths from the two-dimensional image display device to the observer's left and right eyes.

16. An image display apparatus as claimed in claim 11,
wherein the image light exiting from the two-dimensional image display device is polarized in a specific manner, and the optical path switcher comprises a polarization conversion device, disposed between the two-dimensional image display device and the eyepiece optical systems, for time-divisionally converting a polarization direction of the image light, and a pair of left and right polarizing plates disposed between the polarization conversion device and the observer's left eye and between the polarization conversion device and the observer's right eye, respectively, with their polarization axes perpendicular to each other.

17. An image display apparatus as claimed in claim 11,
wherein the optical path switcher is composed of a first illuminator and a second illuminator that time-divisionally and alternately illuminate the two-dimensional image display device, so that the image light exiting from the two-dimensional image display device when illuminated by the first illuminator enters only the eyepiece optical system for the left eye, and that the image light exiting from the two-dimensional image display device when illuminated by the second illuminator enters only the eyepiece optical system for the right eye.

18. An image display apparatus as claimed in claim 11,
wherein the image signal is a three-dimensional image signal containing parallax information associated with the observer's left and right eyes.

19. An image display apparatus as claimed in claim 18,
wherein the image signal is a three-dimensional image signal containing parallax information conforming to a field sequential input method.

20. An image display apparatus as claimed in claim 11,
wherein the image signal is contains three primary-color, namely R, G, and B, components, and, to make distortion of R, G, and B images perceived by the observer's eyes identical, the image compensator electrically compensates the image signal for distortion independently for the R, G, and B components and then outputs R, G, and B image signals.

* * * * *